United States Patent [19]

Bien

[11] Patent Number: 4,940,002
[45] Date of Patent: Jul. 10, 1990

[54] RAILWAY TRACTION MOTOR WITH SKEWED SUPPORT BEARINGS

[75] Inventor: Paul R. Bien, Downers Grove, Ill.

[73] Assignee: General Motors Corporation, Detroit, Mich.

[21] Appl. No.: 280,799

[22] Filed: Dec. 7, 1988

[51] Int. Cl.$^5$ .......................................... B61C 17/00
[52] U.S. Cl. ................................. 105/136; 105/103; 384/192
[58] Field of Search ................. 384/191, 191.1, 191.2, 384/191.3, 191.4, 192; 105/136, 108

[56] References Cited

U.S. PATENT DOCUMENTS

| | | | |
|---|---|---|---|
| 798,237 | 8/1905 | Storer | 323/340 |
| 902,017 | 10/1908 | Stowe | 105/136 |
| 1,314,500 | 9/1919 | Broomall et al. | 105/136 |
| 2,323,662 | 10/1942 | Jenkins et al. | 123/51 R |
| 3,662,858 | 5/1972 | Peterson | 308/132 |
| 3,765,734 | 10/1973 | Peterson | 308/132 |
| 4,075,950 | 2/1978 | Marta et al. | 105/197 A |
| 4,603,865 | 8/1986 | Bien | 277/12 |
| 4,628,824 | 12/1986 | Goding et al. | 105/168 |

FOREIGN PATENT DOCUMENTS 107213 9/1927 Austria ................. 384/192

OTHER PUBLICATIONS

Electro-Motive Maintenance Instruction, M.I. 3900, Revision G, Updated pp. 1, 23-25, Electro Motive Division, LaGrange, Ill., 60525.
Electro-Motive Maintenance Instruction, M.I. 1805, Updated, pp. 1, 24, 29, Electro-Motive Division, La-Grange, Ill., 60525.

Primary Examiner—Douglas C. Butler
Assistant Examiner—Virna Liss Mojica
Attorney, Agent, or Firm—Robert J. Outland

[57] ABSTRACT

A railway locomotive truck provides improved mountings and/or configurations for traction motor axle support bearings to improve their wear life. These include tilting, or sloping, of the support bearing bores to more closely match the orientations of the bearing journal surfaces on the axles which slope as a result of bending of the axles under the weight of the locomotive. An added feature is forming the bearing bores with a slight conicity to accommodate slight tilting of the traction motor under heavy loads due to taking up of the clearances in the motor support axle bearings. Other features include various ways of mountings or altering the construction of the axle bearings to provide the desired positioning.

8 Claims, 4 Drawing Sheets

RAILWAY TRACTION MOTOR WITH SKEWED SUPPORT BEARINGS

TECHNICAL FIELD

This invention relates to railway traction motors and, more particularly, to support bearings of axle supported traction motors for powered rail vehicles, such as locomotives and the like.

BACKGROUND

It is known in the art relating to locomotives and other powered rail vehicles to drive the powered wheel and axle assemblies with electric traction motors supported partially on the frame of the vehicle, or an associated railway truck, and partially on the axle to which the motor is drivingly connected. Commonly, a pinion gear on the motor output shaft engages a larger gear on the driven axle. A predetermined center distance is maintained by support bearings on one side of the motor frame which engage the axle at spaced locations near the drive wheels to support one side of the traction motor on the axle.

In such constructions, it is common to use oil lubricated split sleeve bearings as the motor support bearings, although various other types of bearings can alternatively be used. One proposed arrangement of this type is shown, for example, in U.S. Pat. No. 3,765,734, issued Oct. 16, 1973 to the assignee of the present invention. The bearing bores usually include cylindrical portions which are aligned with one another on an axis that is generally coaxial with that of the axle. The outer portions of the bearings may be relieved with radii or conical portions to accommodate some wear and misalignment of the bearings and the associated axle journals.

In the case of some relatively heavily loaded high powered diesel-electric locomotives in commercial service, I have concluded that under certain conditions wear of the motor support bearings is primarily concentrated on the outer edges of the bearings, adjacent their thrust flanges, and is most severe in those heavily loaded bearings that are located on the pinion end of the traction motor, adjacent to the axle mounted drive gear.

SUMMARY OF THE INVENTION

The present invention provides improved mountings and/or configurations for traction motor axle support bearings to improve their wear life. Among its features, the invention involves tilting of the support bearing bores to more closely match the orientations of the bearing journal surfaces on the axles. These are slightly tilted as a result of bending of the axles under the weight of the locomotive.

An added feature is forming the bearing bores with a slight conicity to accommodate the slight tilting of the traction motor under heavy load due to taking up of the clearances in the motor support axle bearings. Other features include various ways of mounting or altering the construction of the axle bearings to provide the desired positioning.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
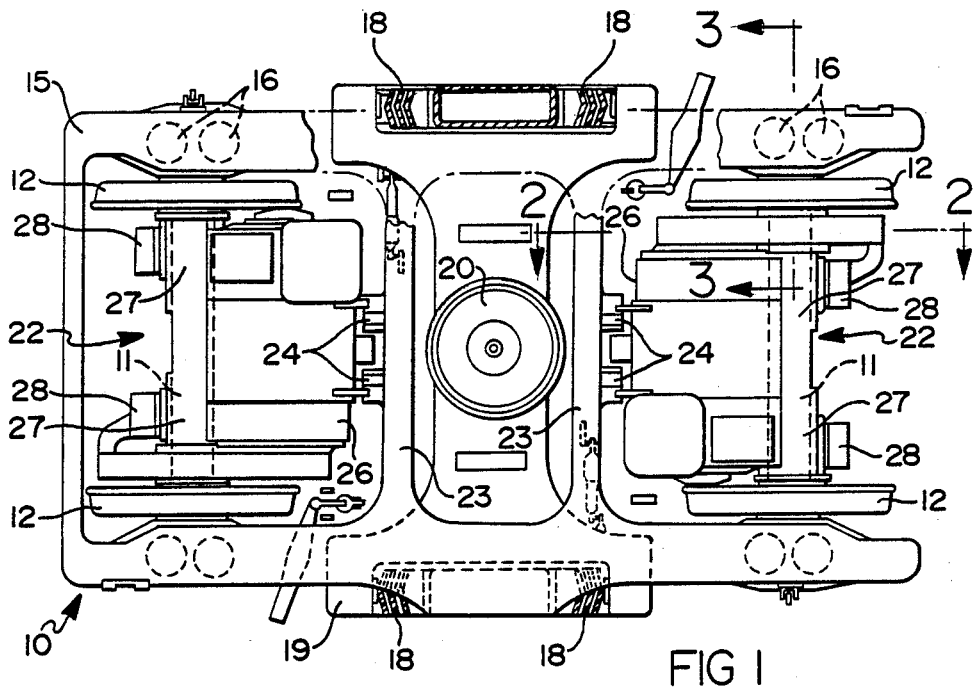
FIG. 1 is a top plan view of the conventional portions of a railway locomotive truck having improved traction motor support bearing means in accordance with the invention.
Figure 2:
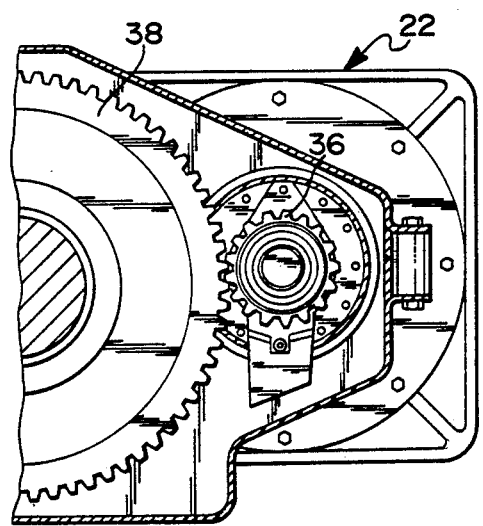
FIG. 2 is a cross-sectional view in the plane of the line 2—2 of FIG. 1 showing the traction motor and axle drive gears.
Figure 3:
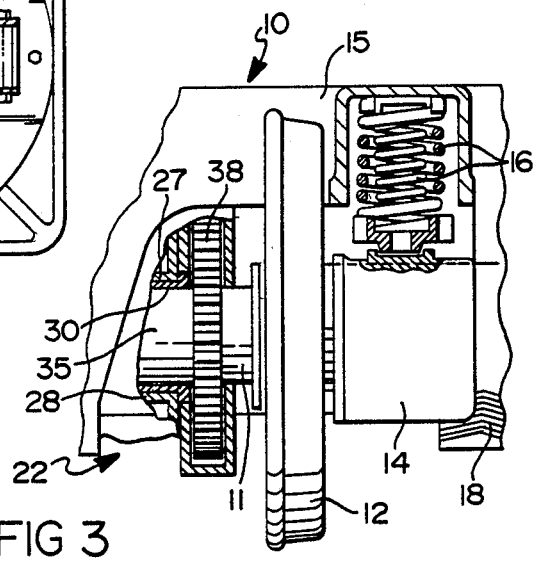
FIG. 3 is a cross-sectional view in the plane of the line 3—3 of FIG. 1 showing portions of an improved motor support bearing, the associated axle drive gear and the primary suspension for the locomotive and truck frame.

Referring now to the drawings in detail, numeral 10 generally indicates a railway locomotive truck of a type similar to that shown, for example, in U.S. Pat. No. 4,075,950, issued Feb. 28, 1978 to the assignee of the present invention. This prior truck represents only one of the many locomotive and railway truck arrangements to which the invention could be applicable.

Like the prior truck, the truck 10 is to be installed under the carbody of a locomotive having an underframe with a fixed bolster near either end, each bolster having a circular center plate, all as shown in U.S. Pat. No. 4,075,950 previously referred to The center plates provide swivel connections by means of which the carbody is secured to and supported by a pair of associated trucks 10.

Each truck 10 has a pair of longitudinally spaced axles 11 mounting flanged wheels 12 for supporting and guiding the truck on the rails, not shown, of an associated track. On their ends, outboard of the wheels, the axles 11 carry journal boxes 14 on which a rigid truck frame 15 is supported by means of a primary suspension comprising coil springs 16. The frame in turn supports, via pads 18 of a secondary suspension, a bolster 19 having a center plate 20 that engages and supports the associated circular center plate of the carbody, all as described in further detail in U.S. Pat. No. 4,075,950.

The truck 10 further includes a pair of traction motors 22 carried partly on the axles 11 and partly on transverse transoms 23 of the truck frame. The connection with the transoms is through a resilient suspension 24 extending between the transoms and their respective motor housings 26. On their other sides, at the ends thereof, the motor housings have a pair of recessed bearing supports 27 with attached bearing caps 28 that together receive a pair of support bearings 30 spaced at locations near opposite ends of the motor.

The support bearings are preferably each formed of two semi-cylindrical flanged half shells. They could be of the sort shown in U.S. Pat. No. 3,765,734, issued Oct. 16, 1973 to the assignee of the present invention, which is referred to primarily for its illustration of the surrounding traction motor structure. However, more conventional bearing arrangements have the split lines of the half shells rotated about one quarter turn with the lubricant window located in only one of the shells, as shown in U.S. Pat. No. 3,662,858 issued May 16, 1972 to the assignee of the present invention.

The bearings 30 define transverse bearing bores 31, each having an axis 32, 34. The bearing bores 31 are each engagable with a lubricated journal 35 of the associated axle located near one of the wheels to at least partially support the traction motor on the axle.

The traction motors 22 are adapted to drive the axles on which they are respectively supported through pinion gears 36 on the motors 22 which are in constant engagement with larger axle gears 38, each fixed to its axle inwardly adjacent a wheel near one end of the axle.

When the traction motors are driving their axles 11, the torque reactions are absorbed by the motor supports, the largest reaction force being absorbed by the support bearing 30 which is located on the pinion end of the motor 22, inwardly adjacent the axle gear 38. The direction of this reaction force depends upon the direction of the force applied by the pinion gear against the respective axle gear, which varies depending upon the direction of motion of the locomotive and whether the motor is driving or braking the axle. Thus the reaction force is either increased or diminished by the mass of the traction motor being supported by the pinion end bearing 30.

Figure 4:
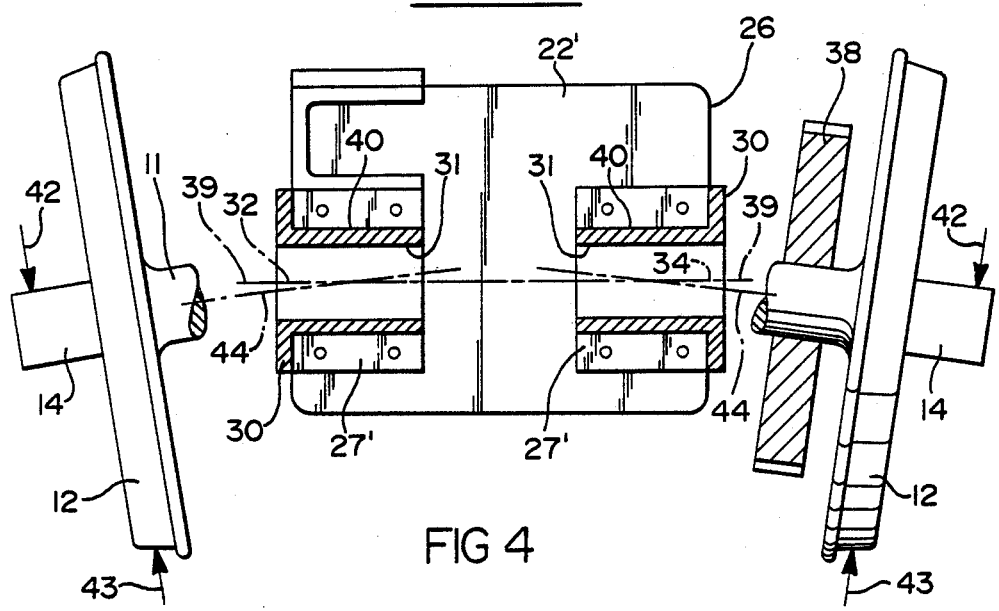
FIG. 4 is a schematic view of the traction motor support bearing and axle relationship for a prior conventional locomotive truck arrangement similar to that shown in FIGS. 1-3.

As shown in the prior art arrangement of FIG. 4, the bearing supports 27, of the conventional traction motor 22, have bearing receiving means with axes 39 that are aligned end to end to form a single axis 39. The support bearings 30 are conventionally formed with bearing bores 31 that are concentric with their outer diameters 40 so that the bearing axes 32, 34 are coextensive with the support axes 39. It is common, however, to form the bearing bores with tapered or conical outer and inner portions, as shown for example in FIG. 8, to allow for some misalignment of the bearings and the axle journals and reduce edge wear of the bearings.

In spite of this conicity, I have noted that, in service, wear of the traction motor support bearings 30 is greatest at the outer ends of their concentric center portions, which are normally cylindrical, and that the pinion end bearing normally occasions the greatest wear I have concluded that this result is caused, at least in part, by a concave downward bending of the locomotive axles which is shown greatly exaggerated in FIGS. 4-7.

This bending is caused by the total weight of the locomotive and truck frames which is applied to the ends of the axles 11 by the springs 16 acting on the journal boxes 14 as represented by the downward pointing arrows 42 of FIG. 4. The supporting reaction force of the railway track upon the wheels 12 is indicated by the upward pointing arrows 43 Since the supporting forces of arrows 43 on the wheels 12 are inward of the downward weight forces of arrows 42, there is a bending moment applied to each axle which causes a small but significant bending of the axle downward at its ends under the weight of the locomotive. Thus, the axes 44 of the axle support journals 35 form slight downwardly sloping angles outwardly with respect to the axes 32, 34 of the bearings 30, resulting in greater wear at the edges of the bearings.

In accordance with the present invention, the axes 32, 34 of the bearings 30 are relocated at slight downward angles outward which are roughly equivalent to the downward bowing angles of their associated axle journals 35. In this way, the journals and their bearings are more closely aligned and bearing wear is more evenly distributed.

Figure 5:
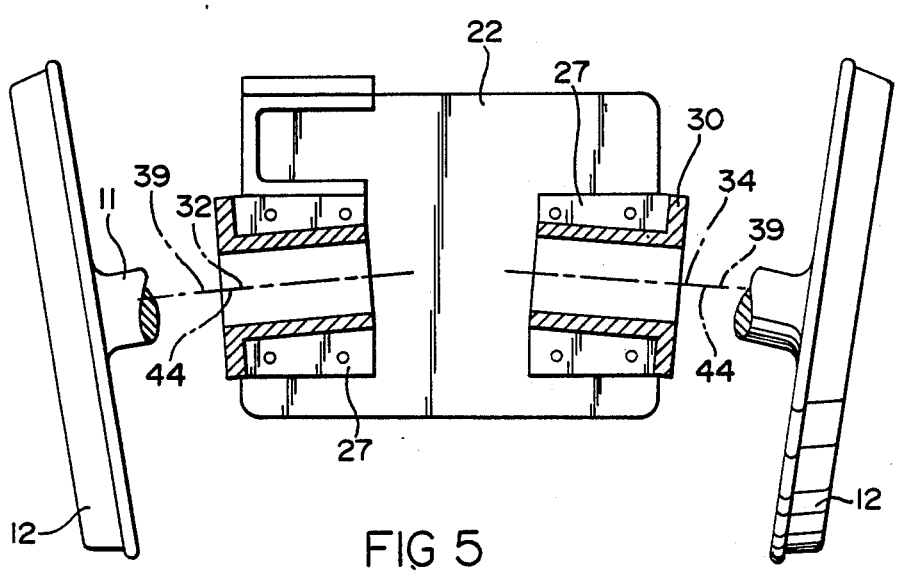
FIG. 5 is a schematic view similar to FIG. 4 but showing a modified motor support bearing mounting in accordance with the invention.

The downward angling of the bearing bores 31 and their axes 32, 34 may be accomplished in any suitable manner. In the embodiment of FIG. 5, it is accomplished by angling downward and outward the axes 39 of the bearing supports 27 to match the axes 44 of the journals 35. This allows the use of conventional support bearings 30 having concentric inner and outer diameters while providing for downward angling of the bearing axes 32, 34 as installed to give the desired results. However, this arrangement requires altering the machining, and possibly the associated support means, of the traction motor 22 which affects a major component and may not be possible, or at least easily accomplished, in traction motors already manufactured.

Figure 6:
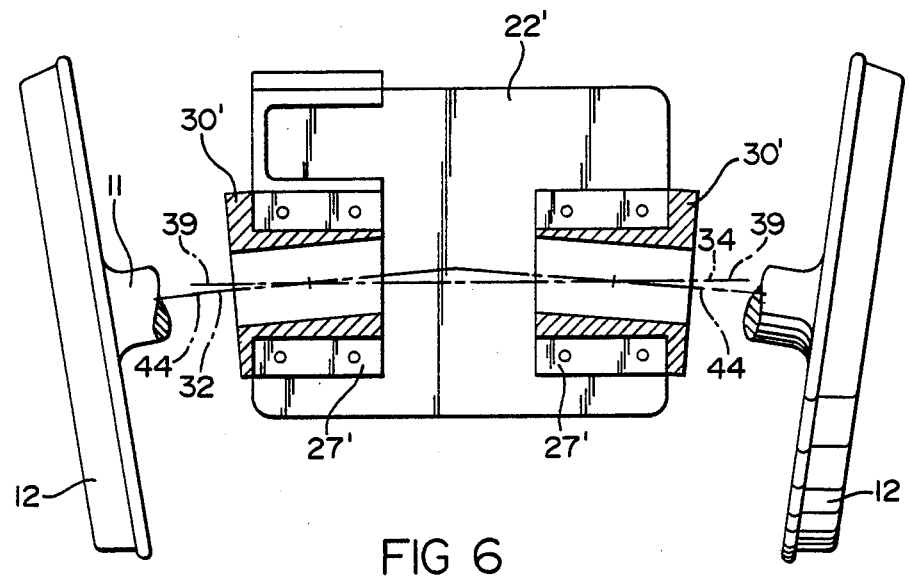
FIG. 6 is a schematic view similar to FIG. 4 but showing modified bearings mounted in the conventional motor bearing supports in accordance with the invention.

Accordingly, a preferred arrangement, as shown in FIG. 6, utilizes special support bearings 30' in which the bearing bore axes 32, 34 are sloped or angled downwardly and outwardly relative to the axes of their outer diameters, which are coextensive with the aligned axes 39 of the bearing supports of the conventional motor 22'. In this way, the modified bearings 30' can be used for service applications on current locomotives as well as in new applications.

One problem occasioned by this solution is a possible increase in the number of different bearing halves required in view of the need for a lubricant window in one of the two bearing halves for each bearing. This might be overcome by providing windows in both halves to allow the bearings to be reversed for use on opposite sides as is now done. Alternatively, provision of intermediate adapters or an effective reworking scheme for the motor frames could allow the use of conventional concentric bearings 30.

Figure 7:
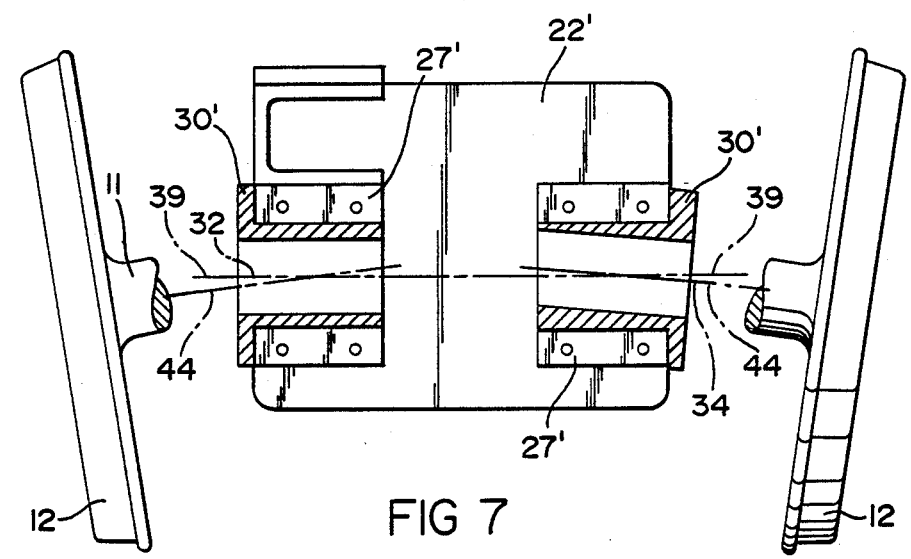
FIG. 7 is a schematic view similar to FIG. 4 but showing a motor with a modified bearing in only the pinion end bearing support in accordance with the invention.

Another alternative, shown in FIG. 7, utilizes a conventional bearing 30 in the more lightly loaded end of the traction motor and an angled bearing 30' in accordance with the invention at the more heavily loaded pinion end of the traction motor. In this way, fewer special bearings are required and the bearing wear is reduced in the location where it has been found to be the greatest.

In accordance with a further feature of the invention, it has been recognized that the wear of the support bearings 30, 30', especially at the pinion end, may be further affected by a slight tilting of the traction motor under load. This result is possible because the required clearances between the support bearings and their respective axle journals 35 allow slight tilting of the traction motor to occur. Such tilting will occur at times when the torque applied by the traction motor is near the maximum load condition and this is also when maximum wear would be expected due to high loading of the pinion end bearing due to the torque reaction.

Figure 8:
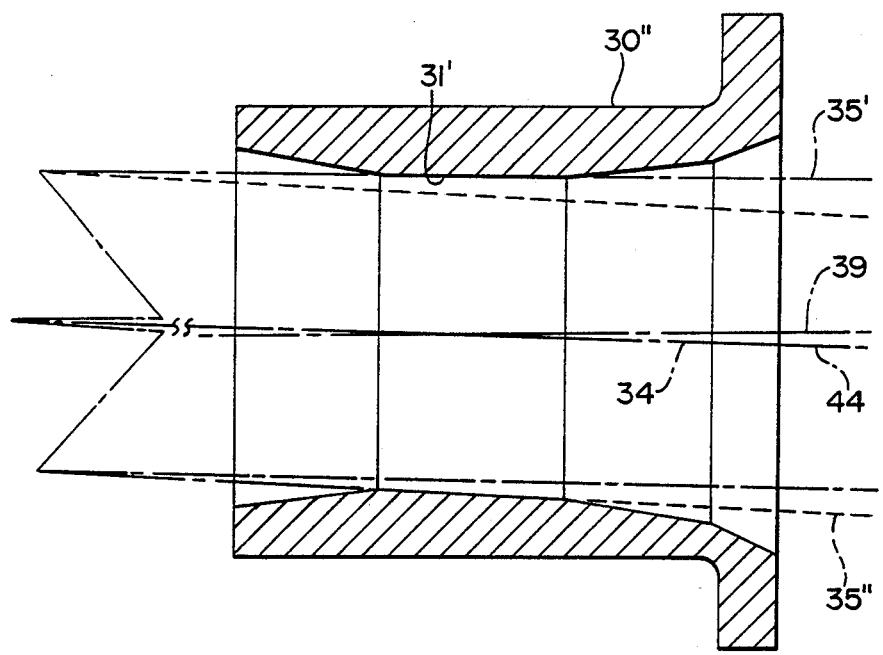
FIG. 8 is an enlarged view of a split traction motor support bearing illustrating modifications made in the bore position and configuration in accordance with the invention.

To account for this tilting condition, the conventional cylindrical and conical shape of the pinion end bearing, at least, may be modified as shown in FIG. 8. Here, the bearing bore 31' has been opened outwardly by applying an additional conical adjustment to the previous cylindrical and conical portions of the bearing bore. The bearing shape is thus made slightly conical overall in essentially the amount needed to accommodate the tilting action of the traction motor in the opposite directions of loading shown by the phantom and dashed lines indicating relative axle journal position 35' and 35", respectively. This provides for more even distribution of the bearing load on the central bearing surface of the bore 31' under high load conditions in both directions of locomotive operation. Thus, the bearing 30" of FIG. 8 includes both the downward sloping of the bearing bore 31' needed to match the bowing of the locomotive axles and also the slight conicity of the bore 31' needed to account for the tilting of the associated traction motor relative to the axle under its most heavily loaded conditions.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A traction motor for a railway power vehicle of the type having a body, a rail engagable wheel and axle assembly including a pair of laterally spaced driving wheels fixed to an axle with motor support journals on the axle inwardly adjacent the wheels, said body being supported on at least one wheel and axle assembly by suspension means engaging the axle at support points outboard of the wheels, whereby the weight of the body causes slight concave downward bending of the axle between the wheels with resulting outwardly downward sloping of the support journals and respective axes thereof,
   said traction motor having a frame with a pair of bearing supports disposed at spaced locations near opposite ends of the motor frame and each including an axle support bearing having a transverse bore centered on an axis, said bearing bores being engagable with the motor support journals of the axle at spaced locations between and relatively near the wheels to at least partially support the motor on the axle, and the improvement wherein
   the axis of at least one of the bearing bores is sloped downwardly toward its respective end of the traction motor by a small amount sufficient to more closely align the axis of the said one bearing bore with the downwardly sloping axis of the associated motor support journal at the location of their engagement and thus improve the conformity of the engagable bearing bore and motor support journal surfaces.

2. A traction motor for a railway power vehicle as in claim 1, the vehicle further including an axle gear fixed to the axle between one of the wheels and the adjacent motor support journal and said traction motor further including a pinion gear engagable with the axle gear for driving the axle in either direction of rotation, said bearing bores having a predetermined clearance about the axle that allows slight tilting of the traction motor relative to the axle under load and the further improvement wherein
   the bore between the ends of said at least one bearing is conical, being outwardly enlarged in a degree to at least partially compensate for the tilting of the motor under load and further improve the conformity of the loaded surface of the one bearing with the corresponding engagable surface of the axle support bearing.

3. A traction motor for a railway power vehicle of the type having a body, a rail engagable wheel and axle assembly including a pair of laterally spaced driving wheels fixed to an axle with motor support journals on the axle inwardly adjacent the wheels, said body being supported on at least one wheel and axle assembly by suspension means engaging the axle at support points outboard of the wheels,
   said traction motor having a frame with a pair of bearing supports disposed at spaced locations near opposite ends of the motor frame and each including an axle support bearing having a transverse bore centered on an axis, said bearing bores being engagable with the motor support journals of the axle at spaced locations between and relatively near the wheels to at least partially support the motor on the axle,
   the vehicle further including an axle gear fixed to the axle between one of the wheels and the adjacent motor support journal and said traction motor further including a pinion gear engagable with the axle gear for driving the axle in either direction of rotation, said bearing bores having a predetermined clearance about their respective motor support journals that allows slight tilting of the traction motor relative to the axle under load, and the improvement wherein
   the bore between the ends of at least one of said bearings is conical, being outwardly enlarged in a degree to at least partially compensate for the tilting of the motor under load and improve the conformity of the loaded surface of the one bearing with the corresponding engagable surface of the motor support journal.

4. A traction motor as in claim 1 and further having a pinion end on which is carried a pinion gear, wherein the said at least one bearing consists of only that bearing closest to the pinion end of the traction motor.

5. A traction motor as in claim 2 wherein the said at least one bearing consists of only that bearing closest to the pinion end of the traction motor.

6. A traction motor as in claim 3 wherein the said at least one bearing consists of only that bearing closest to the pinion end of the traction motor.

7. A traction motor as in claim 1 wherein the support bearings are generally cylindrical and are received in mating bores of the bearing supports, the downward sloping of the said at least one bearing bore being produced by a corresponding downward sloping of the mating bore in its associated bearing support.

8. A traction motor as in claim 1 wherein the downward sloping of said at least one bearing bore is produced by angularly misaligning inner and outer diameters of the particular support bearing and the mating bores of the bearing supports are aligned on a common axis.

* * * * *